(12) United States Patent
Hickey et al.

(10) Patent No.: US 11,387,505 B2
(45) Date of Patent: Jul. 12, 2022

(54) BATTERY PACK THERMAL MANAGEMENT SYSTEMS AND VEHICLES INCORPORATING THE SAME

(71) Applicant: GM GLOBAL TECHNOLOGY OPERATIONS LLC, Detroit, MI (US)

(72) Inventors: Ryan P. Hickey, Royal Oak, MI (US); Cody Demara, Clinton Township, MI (US); Pushpendra Chauhan, Southfield, MI (US); Benjamin G. Wroblewski, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 17/039,088

(22) Filed: Sep. 30, 2020

(65) Prior Publication Data

US 2022/0102780 A1   Mar. 31, 2022

(51) Int. Cl.
| | |
|---|---|
| *B60K 1/04* | (2019.01) |
| *H01M 10/6568* | (2014.01) |
| *H01M 10/613* | (2014.01) |
| *H01M 10/63* | (2014.01) |
| *H01M 10/6556* | (2014.01) |
| *B60L 50/60* | (2019.01) |
| *B60L 58/26* | (2019.01) |

(Continued)

(52) U.S. Cl.
CPC .......... *H01M 10/6568* (2015.04); *B60K 1/04* (2013.01); *B60K 6/28* (2013.01); *B60L 50/66* (2019.02); *B60L 58/26* (2019.02); *H01M 10/613* (2015.04); *H01M 10/625* (2015.04); *H01M 10/63* (2015.04); *H01M 10/6556* (2015.04); *B60K 2001/005* (2013.01); *B60L 2240/545* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC .. H01M 10/613; H01M 10/6568; B60L 50/60
See application file for complete search history.

(56) References Cited

U.S. PATENT DOCUMENTS

| 4,350,026 A | * | 9/1982 | Klein | ........................ F28B 1/06 |
| | | | | 257/714 |
| 6,889,515 B2 | * | 5/2005 | Tilton | ................. H01L 23/4735 |
| | | | | 62/304 |

(Continued)

*Primary Examiner* — Jonathan Ng
*Assistant Examiner* — James J Triggs
(74) *Attorney, Agent, or Firm* — Quinn IP Law

(57) ABSTRACT

A battery pack thermal management system can include a battery pack including a plurality of battery modules encased within a battery case, a coolant line having an inlet and an outlet each penetrating a perimeter of the battery case and at least one thermally activated valve. The at least one thermally activated valve can be configured to spray coolant onto one or more battery modules responsive to a temperature within the battery pack exceeding a temperature threshold. The temperature threshold can be defined based on the temperature of a thermal event occurring within the battery pack which exceeds a normal operating temperature of the battery pack. The coolant line within the battery pack is biased towards the perimeter of the battery case. The battery pack can power a battery electric or hybrid electric vehicle.

20 Claims, 3 Drawing Sheets

(51) Int. Cl.
*B60K 6/28* (2007.10)
*H01M 10/625* (2014.01)
*B60K 1/00* (2006.01)

(56) References Cited

U.S. PATENT DOCUMENTS

| | | | |
|---|---|---|---|
| 6,955,063 B2 * | 10/2005 | Adiga | F28D 5/00 |
| | | | 62/304 |
| 8,329,325 B2 * | 12/2012 | Brodie | B60L 1/003 |
| | | | 429/61 |
| 8,383,260 B2 | 2/2013 | Essinger et al. | |
| 8,435,668 B2 | 5/2013 | Kumar et al. | |
| 8,563,154 B2 | 10/2013 | Graban et al. | |
| 8,852,772 B2 | 10/2014 | McDonald | |
| 10,923,287 B1 | 2/2021 | Coppola et al. | |
| 2009/0249807 A1 | 10/2009 | Nemesh et al. | |
| 2011/0200860 A1 * | 8/2011 | Brodie | H01M 10/6569 |
| | | | 429/120 |
| 2019/0357386 A1 | 11/2019 | Coppola et al. | |

* cited by examiner

BATTERY PACK THERMAL MANAGEMENT SYSTEMS AND VEHICLES INCORPORATING THE SAME

BACKGROUND

A battery pack having a power capability suitable for energizing one or more electric traction motors or generators typically includes multiple battery modules each containing an arrangement of electrochemical battery cells. In some battery cell configurations, relatively thin cathode and anode plates are enclosed within a foil pouch containing an electrolyte fluid, with positive and negative electrodes or cell terminals extending from opposite ends of the foil pouch. The individual cell terminals are electrically connected in a given one of the battery modules, e.g., via an ultrasonic welding technique. The battery pack is then assembled by electrically connecting an application-specific number of battery modules together via a voltage bus having positive and negative bus bars. For example, multiple battery modules may be arranged on a flat battery tray and serially connected, after which an outer cover is secured to the battery tray to protect the battery modules.

Battery packs, particularly of the high-voltage type described above, generate substantial amounts of heat during sustained operation. Over time, the generated heat degrades the efficiency and overall structural integrity of the battery pack. Thermal management systems are therefore used to closely regulate the temperature of the battery pack. In a common type of thermal management system, heat transfer fluid is circulated within a battery pack to introduce or remove heat.

SUMMARY

Provided are battery pack thermal management systems which can include a battery pack including a plurality of battery modules encased within a battery case, a coolant line having an inlet and an outlet each penetrating a perimeter of the battery case, and at least one thermally activated valve. The at least one thermally activated valve can be configured to spray coolant onto one or more battery modules responsive to a temperature within the battery pack exceeding a temperature threshold. The temperature threshold can be defined based on the temperature of a thermal event occurring within the battery pack which exceeds a normal operating temperature of the battery pack. The coolant line within the battery pack can be biased towards the perimeter of the battery case. The coolant line within the battery pack can be contiguous with the battery case. At least 90% of the length of the coolant line within the battery case can be contiguous with the battery case. The one or more thermally activated valves do not require a temperature sensor to spray coolant. The battery pack thermal management system can include a thermally activated valve corresponding to each battery module. The thermally activated valve can include a hollow metal body capable of facilitating fluid communication between the coolant line and the one or more battery modules when in an open position and a thermally activated material disposed within the hollow body preventing fluid communication between the coolant line and the one or more battery modules when the temperature of the thermally activated material is below the temperature threshold and the thermally activated valve is in a closed position. The thermally activated material can be $[(CH_2)_{11}C(O)NH]_n$. The thermally activated valve can further include a turbulizer head configured to disperse coolant when the thermally activated valve is in an open position.

Provided are vehicles, which include a powertrain configured to transmit torque to at least one wheel and including a high-voltage battery pack. The battery pack can include a battery pack including a plurality of battery modules encased within a battery case, a coolant line having an inlet and an outlet each penetrating a perimeter of the battery case, and at least one thermally activated valve. The at least one thermally activated valve can be configured to spray coolant onto one or more battery modules responsive to a temperature within the battery pack exceeding a temperature threshold. The temperature threshold can be defined based on the temperature of a thermal event occurring within the battery pack which exceeds a normal operating temperature of the battery pack. The coolant line within the battery pack can be biased towards the perimeter of the battery case. At least 90% of the length of the coolant line within the battery case can be contiguous with the battery case. The thermally activated valve can include a hollow metal body capable of facilitating fluid communication between the coolant line and the one or more battery modules when in an open position and a thermally activated material disposed within the hollow body preventing fluid communication between the coolant line and the one or more battery modules when the temperature of the thermally activated material is below the temperature threshold and the thermally activated valve is in a closed position. The thermally activated material can be $[(CH_2)_{11}C(O)NH]_n$. The thermally activated valve can further include a turbulizer head configured to disperse coolant when the thermally activated valve is in an open position. The vehicle can be a hybrid electric vehicle. The vehicle can be a battery electric vehicle.

Battery electric vehicles are provided and can include a powertrain configured to transmit torque to at least one wheel and including a high-voltage battery pack. The battery pack can include a battery pack including a plurality of battery modules encased within a battery case, a coolant line having an inlet and an outlet each penetrating a perimeter of the battery case and biased towards the perimeter of the battery case, and at least one thermally activated valve. Each of the at least one thermally activated valves can include a hollow metal body capable of facilitating fluid communication between the coolant line and the one or more battery modules when in an open position and a thermally activated material disposed within the hollow body preventing fluid communication between the coolant line and the one or more battery modules when the temperature of the thermally activated material is below the temperature threshold and the thermally activated valve is in a closed position. The thermally activated material of the at least one thermally activated valve can be $[(CH_2)_{11}C(O)NH]_n$, and the at least one thermally activated valve can be configured to spray coolant inward from the perimeter of the battery case onto one or more battery modules in the open position responsive to a temperature within the battery pack exceeding a temperature threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
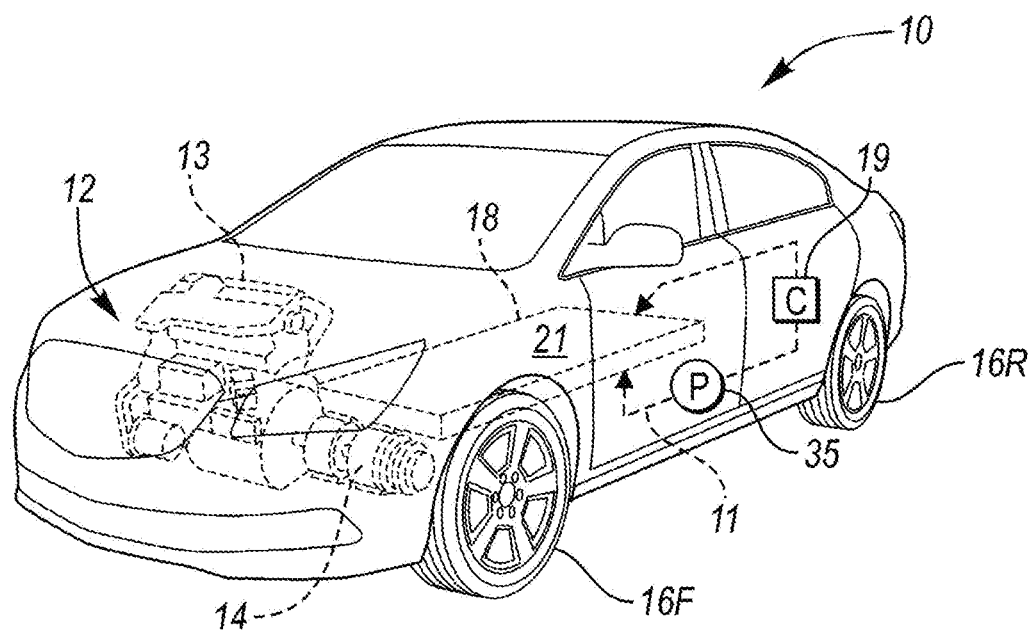
FIG. 1 illustrates a schematic perspective view of a motor vehicle having a battery pack, according to one or more embodiments.

Referring to the drawings, wherein like reference numbers refer to like components throughout the several views, a motor vehicle 10 is shown in FIG. 1 having a powertrain 12 that includes a high-voltage battery pack 18. The battery pack 18 may have a relatively flat, generally rectangular shape as shown, or the battery pack 18 may be arranged in a T-configuration or other application-suitable shape. The powertrain 12 may optionally include an internal combustion engine 13 and one or more electric machines 14 in a hybrid electric vehicle embodiment, or may forego use of the engine 13 in a battery electric vehicle embodiment powered solely by the one or more electric machines 14 energized via the battery pack 18.

In both embodiments, the powertrain 12 transmits torque generated by the engine 13 and/or the electric machine(s) 14 to at least one wheel (e.g., a set of front drive wheels 16F and/or rear drive wheels 16R), or motor torque from the electric machine 14 may be used solely to crank and start the engine 13. While the motor vehicle 10 is described hereinafter as an example system benefitting from the battery pack 18 as configured according to the present disclosure, the battery pack 18 may be readily adapted for use in marine vessels, aircraft, rail vehicles, robots, and mobile platforms, as well as in power plants and other stationary systems.

The battery pack 18 may use a lithium-ion, nickel-metal hydride, or other application-suitable battery chemistry. By way of example and not limitation, the battery pack 18 may include foil pouch-type or plate-style battery cells (not shown) arranged in a stack and serially connected to provide output power sufficient for energizing the electric machine 14. When the electric machine 14 is embodied as a traction motor for rotating the drive wheels 16F and/or 16R and propelling the motor vehicle 10, for instance, the battery pack 18 may arrange such battery cells in separate battery modules 20 as shown schematically in FIG. 2 so as to produce a direct current (DC) output voltage of 60-300 volts (VDC) or more.

Figure 2:
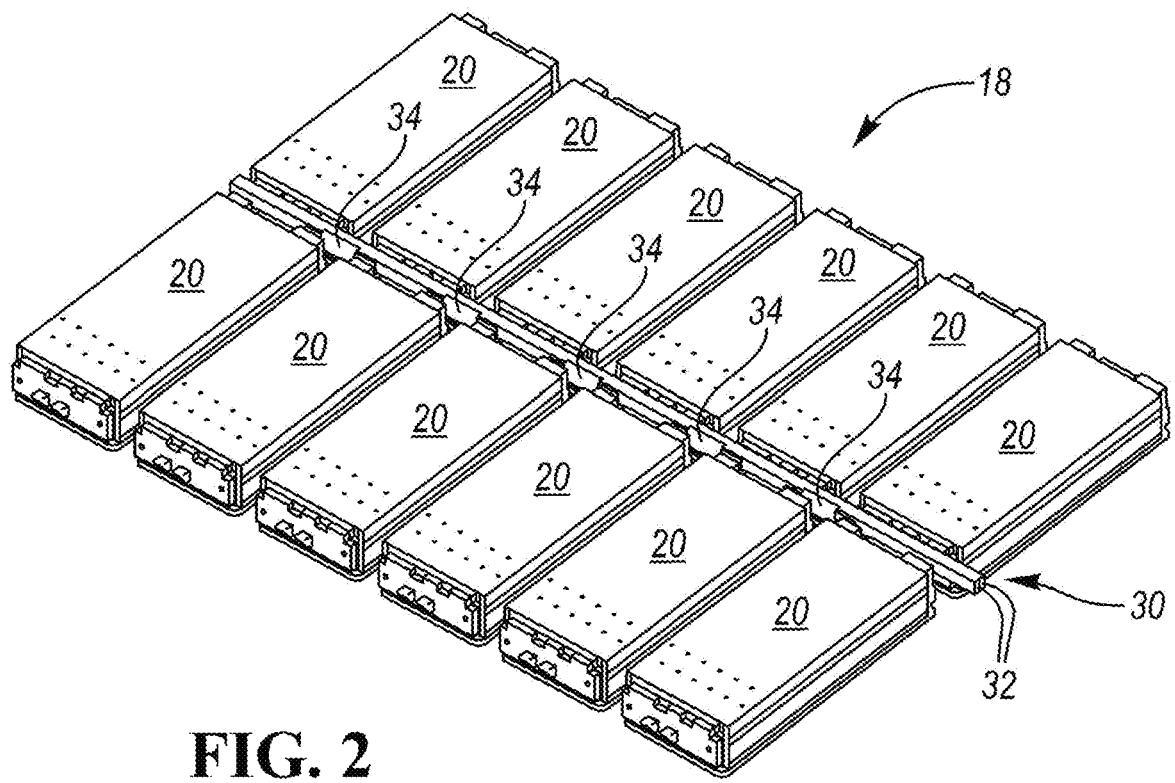
FIG. 2 illustrates a schematic perspective view of a battery pack usable as part of the motor vehicle, according to one or more embodiments.

In order to achieve a relatively high output voltage, the battery modules 20 may be arranged in a particular geometric configuration, such as the flat configuration of FIGS. 1 and 2, and serially connected using a high-voltage bus. The battery pack 18 may be cooled by a thermal management system shown schematically to include a fluid pump (P) configured to circulate heat transfer fluid (arrow 11) to and from the battery pack 18, with warmer or colder heat transfer fluid passing out of the battery pack 18 through a chiller (C) 19 to help regulate a temperature of the battery pack 18. Other components of the thermal management system are omitted for illustrative simplicity, including directional and thermal expansion valves, thermostats, radiators, heat exchangers, etc. Additionally, while associated power electronics are omitted from FIG. 1 for illustrative simplicity, such components typically include a power inverter module using pulse width modulation (PWM)-controlled semiconductor switches to invert a DC voltage from the battery pack 18 into an alternating current voltage (VAC) for powering the electric machine 14, a DC-DC converter or auxiliary power module for reducing the voltage level from the battery pack 18 to auxiliary (e.g., 12-15 VDC) levels sufficient for powering auxiliary electrical systems aboard the vehicle 10.

FIG. 2 depicts a rectangular configuration of the battery pack 18 as described generally above with reference to FIG. 1. In this non-limiting example embodiment, a plurality of battery modules 20, each comprising a plurality of battery cells (not shown) are encased within a battery case 21.

Figure 3:
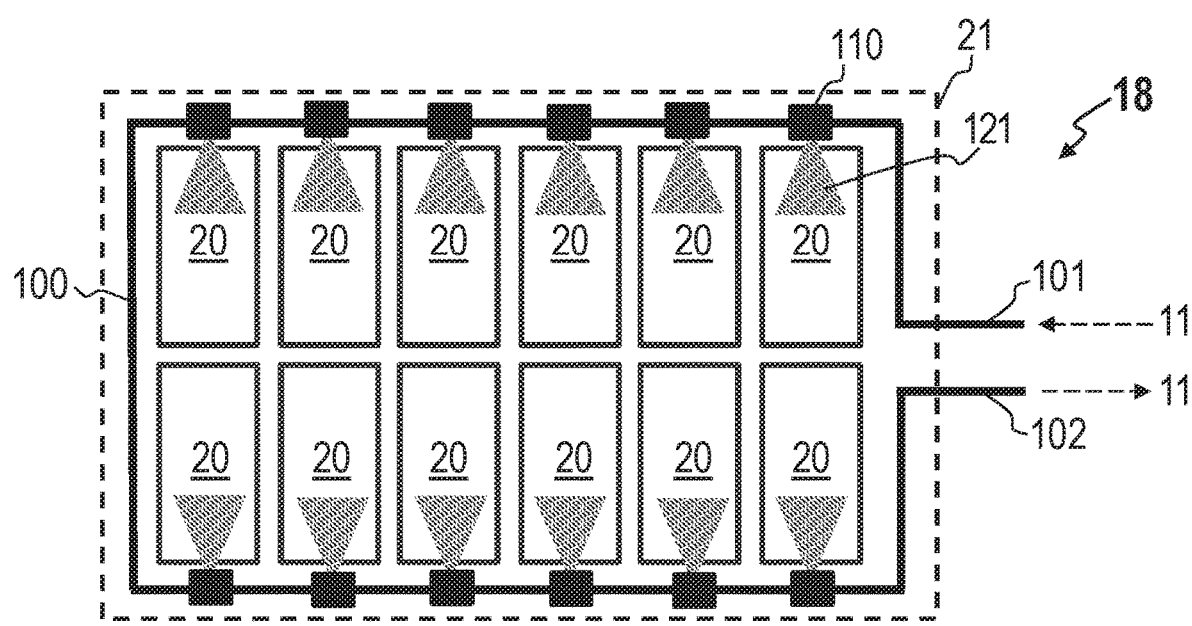
FIG. 3 illustrates a schematic top view of a battery pack, according to one or more embodiments.

In certain instances, battery pack 18 may malfunction or be involved in an accident wherein excessive heat (i.e., a thermal event) is generated by the battery pack 18. FIG. 3 illustrates a schematic top view of battery pack 18 having a thermal management system configured to respond to thermal events. The thermal management system includes a coolant line 100 having an inlet 101 and an outlet 102, each penetrating a perimeter of the battery case 21. The battery case 21 can be constructed of metal, carbon fiber, or polymeric material to satisfy various mechanical and/or thermal requirements. The thermal management system further includes at least one thermally activated valve 110, wherein each of the at least one thermally activated valves are configured to spray coolant 11 onto one or more battery modules 20 responsive to a temperature within the battery pack exceeding a temperature threshold. In some embodiments, one or more of, or each of the at least one thermally activated valves are configured to spray coolant 11 inward from the perimeter of the battery case 21 onto one or more battery modules 20 responsive to a temperature within the battery pack exceeding a temperature threshold. The temperature threshold can be defined based on the temperature of a thermal event occurring within the battery pack which exceeds a normal operating temperature of the battery pack (e.g., the temperature of the battery pack while charging/discharging).

The coolant line 100 can be biased towards the perimeter of the battery case 21, as shown in FIG. 3. Additionally or alternatively, the coolant line 100 can be biased towards the center of the battery case 21, or take various other routes throughout the battery case 21 (e.g., a serpentine route, a spiral route). In some embodiments the coolant line 100 is contiguous with the battery case. For example, at least 90% of the length of the coolant line 100 within the battery case 21 can be contiguous with the battery case 21. The coolant line 100 may additionally circulate coolant through various aspects of the battery pack. For example, battery pack 18 can comprises a backplane assembly 30 positioned between rows of battery cells in contact with a busbar 34 appurtenant each of the one or more battery modules 20. Coolant 11 can be diverted from coolant line 100 into one or more internal conduits 34 of the backplane 30, for example to facilitate cooling or heating of the battery pack 18.

A battery pack 18 can comprise several thermally activated valves 110 and in some embodiments can comprise a thermally activated valve 110 corresponding to each battery module 20 within the battery pack 18. The one or more thermally activated valves 110 advantageously do not require a temperature sensor to operate (i.e., to spray coolant 11 onto one or more battery modules 20 responsive to a temperature within the battery pack 21 exceeding a temperature threshold). Accordingly, the one or more thermally activated valves 110 will operate suitably even if various sensors and electronics appurtenant to the battery pack 18 are damaged or otherwise rendered inoperable.

Figure 4A:
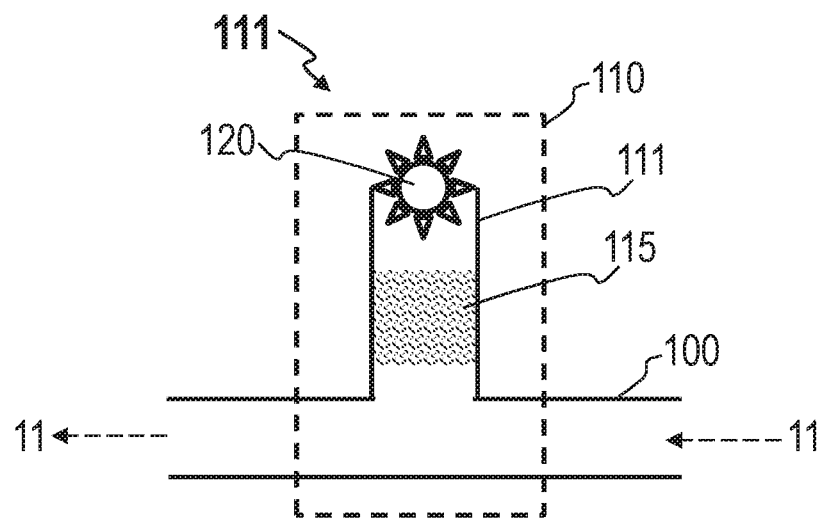
FIG. 4A illustrates a schematic view of a thermally activated valve in a closed position 111, according to one or more embodiments.

FIG. 4A illustrates a schematic view of a valve 110 in a closed position 111. Valve 110 comprises a metal, generally hollow body 111 capable of facilitating fluid communication between the coolant line 100 and the one or more battery modules 20. A thermally activated material 115 is disposed within the hollow body 111 (e.g., a steel body) preventing fluid communication between the coolant line 100 and the one or more battery modules 20 when the valve 110 is in a closed position 111 (i.e., when the temperature of the thermally activated material 115 is below the temperature threshold). For example, the thermally activated material 115 can comprise $[(CH_2)_{11}C(O)NH]_n$ which has a melting point of about 180° C. In this embodiment, and others, the thermally activated material 115 is selected such that its melting point is sufficiently higher than the standard operating temperature of a battery pack 18 but at or below the temperature of a thermal event which the thermal management system is designed to mitigate (e.g., a melting point of about 170° C. to about 190° C.).

Figure 4B:
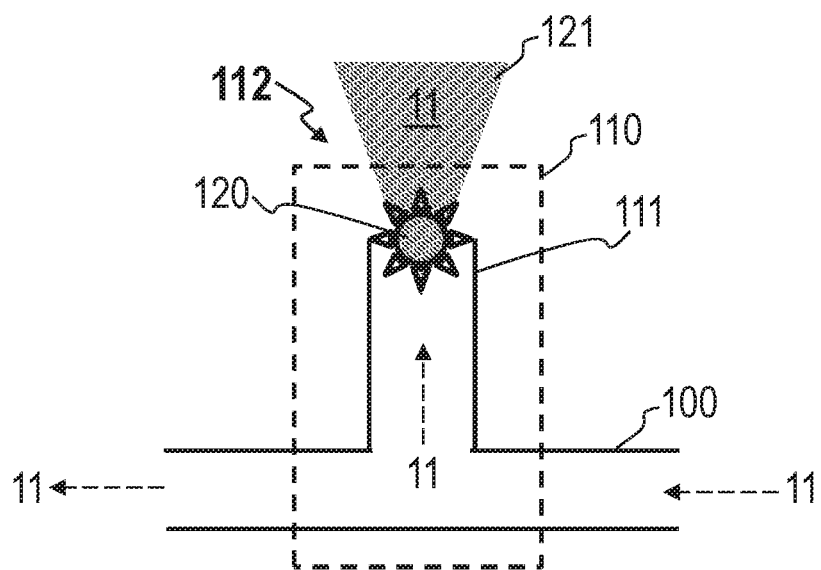
FIG. 4B illustrates a schematic view of a thermally activated valve, according to one or more embodiments.

FIG. 4B illustrates a schematic view of a valve 110 in an open position 112 (i.e., when the temperature of the thermally activated material 115 is at or above the temperature threshold). In this open position 112, the thermally activated material 115 has partially or fully melted, allowing coolant 11 to spray into the battery case and onto one or more battery modules 20. A spray pattern 121 of coolant 11 emitted from a thermally activated valve 110 can be optimized to cover a portion or the entire surface of a given battery module 20. A thermally activated valve 110 can optionally comprise a turbulizer head 120 configured to disperse coolant 11 when the valve 110 is in an open position 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The invention claimed is:

1. A battery pack thermal management system, comprising:
   a battery pack including a plurality of battery modules encased within a battery case;
   a coolant line having an inlet and an outlet each penetrating a perimeter of the battery case; and
   at least one thermally activated valve, wherein the at least one thermally activated valve is configured to spray a coolant onto one or more battery modules responsive to a temperature within the battery pack exceeding a temperature threshold, and the at least one thermally activated valve does not require a temperature sensor to spray the coolant.

2. The battery pack thermal management system of claim 1, wherein the temperature threshold is defined based on the temperature of a thermal event occurring within the battery pack which exceeds a normal operating temperature of the battery pack.

3. The battery pack thermal management system of claim 1, wherein the coolant line within the battery pack is biased towards the perimeter of the battery case.

4. The battery pack thermal management system of claim 1, wherein the coolant line within the battery pack is contiguous with the battery case.

5. The battery pack thermal management system of claim 1, wherein at least 90% of the length of the coolant line within the battery case is contiguous with the battery case.

6. The battery pack thermal management system of claim 1, wherein the battery pack thermal management system comprises a thermally activated valve corresponding to each battery module.

7. The battery pack thermal management system of claim 1, wherein the thermally activated valve comprises a hollow metal body capable of facilitating fluid communication between the coolant line and the one or more battery modules when in an open position and a thermally activated material disposed within the hollow body preventing fluid communication between the coolant line and the one or more battery modules when the temperature of the thermally activated material is below the temperature threshold and the thermally activated valve is in a closed position.

8. The battery pack thermal management system of claim 7, wherein the thermally activated material comprises $[(CH_2)_{11}C(O)NH]_n$.

9. The battery pack thermal management system of claim 7, wherein the thermally activated valve further comprises a turbulizer head configured to disperse the coolant when the thermally activated valve is in an open position.

10. A vehicle comprising:
    a powertrain configured to transmit torque to at least one wheel, and including a high-voltage battery pack, wherein the battery pack comprises:
    a battery pack including a plurality of battery modules encased within a battery case;
    a coolant line having an inlet and an outlet each penetrating a perimeter of the battery case; and
    at least one thermally activated valve, wherein the at least one thermally activated valve is configured to spray a coolant onto one or more battery modules responsive to a temperature within the battery pack exceeding a temperature threshold, and the at least one thermally activated valve does not require a temperature sensor to spray the coolant.

11. The vehicle of claim 10, wherein the temperature threshold is defined based on the temperature of a thermal event occurring within the battery pack which exceeds a normal operating temperature of the battery pack.

12. The vehicle of claim 10, wherein the coolant line within the battery pack is biased towards the perimeter of the battery case.

13. The vehicle of claim 10, wherein at least 90% of the length of the coolant line within the battery case is contiguous with the battery case.

14. The vehicle of claim 10, wherein the thermally activated valve comprises a hollow metal body capable of facilitating fluid communication between the coolant line and the one or more battery modules when in an open position and a thermally activated material disposed within the hollow body preventing fluid communication between the coolant line and the one or more battery modules when the temperature of the thermally activated material is below the temperature threshold and the thermally activated valve is in a closed position.

15. The vehicle of claim 14, wherein the thermally activated material comprises $[(CH_2)_{11}C(O)NH]_n$.

16. The vehicle of claim 14, wherein the thermally activated valve further comprises a turbulizer head configured to disperse the coolant when the thermally activated valve is in an open position.

17. The vehicle of claim 10, wherein the vehicle is a hybrid electric vehicle.

18. The vehicle of claim 10, wherein the vehicle is a battery electric vehicle.

19. A battery electric vehicle comprising:
a powertrain configured to transmit torque to at least one wheel, and including a high-voltage battery pack, wherein the battery pack comprises:
a battery pack including a plurality of battery modules encased within a battery case;
a coolant line having an inlet and an outlet each penetrating a perimeter of the battery case and biased towards the perimeter of the battery case; and
at least one thermally activated valve comprising a hollow metal body capable of facilitating fluid communication between the coolant line and the one or more battery modules when in an open position to spray a coolant, and a thermally activated material disposed within the hollow body preventing fluid communication between the coolant line and the one or more battery modules when the temperature of the thermally activated material is below the temperature threshold and the thermally activated valve is in a closed position.

20. The battery electric vehicle of claim 19, wherein the thermally activated material of the at least one thermally activated valve comprises $[(CH_2)_{11}C(O)NH]_n$, and the at least one thermally activated valve is configured to spray the coolant inward from the perimeter of the battery case onto one or more battery modules in the open position responsive to a temperature within the battery pack exceeding a temperature threshold.

* * * * *